(12) United States Patent
Frey et al.

(10) Patent No.: US 8,082,450 B2
(45) Date of Patent: Dec. 20, 2011

(54) METHOD FOR CREATING A SECURE COUNTER ON AN ON-BOARD COMPUTER SYSTEM COMPRISING A CHIP CARD

(75) Inventors: Alexandre Frey, Meudon (FR); Dominique Bolignano, Feucherolles (FR); Axelle Apvrille, Roquefort les Pins (FR)

(73) Assignee: Trusted Logic, Versailles (FR)

( * ) Notice: Subject to any disclaimer, the term of this patent is extended or adjusted under 35 U.S.C. 154(b) by 705 days.

(21) Appl. No.: 12/158,991

(22) PCT Filed: Dec. 14, 2006

(86) PCT No.: PCT/FR2006/002766
§ 371 (c)(1),
(2), (4) Date: Aug. 21, 2008

(87) PCT Pub. No.: WO2007/080289
PCT Pub. Date: Jul. 19, 2007

(65) Prior Publication Data
US 2008/0320315 A1    Dec. 25, 2008

(30) Foreign Application Priority Data
Dec. 23, 2005    (FR) ..................... 05 13241

(51) Int. Cl.
*G06F 11/30* (2006.01)
(52) U.S. Cl. ............. 713/189; 713/168; 380/44; 726/20
(58) Field of Classification Search ............. 713/189, 713/159, 168; 380/44; 726/9, 20
See application file for complete search history.

(56) References Cited

U.S. PATENT DOCUMENTS

| 4,841,133 | A | * | 6/1989 | Gercekci et al. | 235/492 |
| 5,767,504 | A | * | 6/1998 | Menconi | 235/492 |
| 6,067,621 | A | * | 5/2000 | Yu et al. | 713/172 |
| 6,085,321 | A | * | 7/2000 | Gibbs et al. | 713/170 |
| 6,385,318 | B1 | * | 5/2002 | Oishi | 380/262 |
| 6,539,480 | B1 | * | 3/2003 | Drews | 713/191 |
| 6,698,661 | B1 | * | 3/2004 | Cooreman et al. | 235/492 |
| 6,836,853 | B1 | * | 12/2004 | Dover et al. | 713/502 |

(Continued)

FOREIGN PATENT DOCUMENTS
EP    1376306 A    1/2004

OTHER PUBLICATIONS

Schneier, Bruce "Applied Cryptography", 1996, John Wiley & Sons, Inc., 2nd Edition, pp. 185-187.*

*Primary Examiner* — Philip Chea
*Assistant Examiner* — Eric W Shepperd
(74) *Attorney, Agent, or Firm* — Browdy and Neimark, PLLC

(57) ABSTRACT

According to the inventive method, the chip card, a counting function (FC), a counter (Cpt) and a private key (Cf) stored in the write-only part of the memory region are stored in a persistent memory, the counter and the private key (Cf) being accessible only by the counting function (FC). When the chip card receives a counter request emitted by an requesting entity (ER), the counting function (FC) performs a modification of the counter (Cpt) and a calculation of a signature, and sends a response to the applicant entity (ER). When the on-board system receives the response to the counter request, the signature contained in the response is checked.

9 Claims, 1 Drawing Sheet

U.S. PATENT DOCUMENTS

| | | |
|---|---|---|
| 7,350,083 B2 * | 3/2008 | Wells et al. .................... 713/193 |
| 7,472,285 B2 * | 12/2008 | Graunke et al. .............. 713/193 |
| 7,681,050 B2 * | 3/2010 | Blom et al. .................... 713/194 |
| 2002/0023217 A1 * | 2/2002 | Wheeler et al. ............... 713/171 |
| 2002/0043566 A1 * | 4/2002 | Goodman et al. ............ 235/492 |
| 2002/0112156 A1 * | 8/2002 | Gien et al. .................... 713/156 |
| 2003/0097344 A1 | 5/2003 | Chaum et al. |
| 2004/0003244 A1 | 1/2004 | England et al. |
| 2004/0054901 A1 | 3/2004 | England et al. |
| 2005/0097336 A1 * | 5/2005 | Canard et al. ................. 713/185 |
| 2006/0168447 A1 * | 7/2006 | Pailles et al. .................. 713/176 |
| 2006/0198515 A1 * | 9/2006 | Forehand et al. .............. 380/28 |
| 2007/0073416 A1 * | 3/2007 | Grawrock ........................ 700/1 |

* cited by examiner

METHOD FOR CREATING A SECURE COUNTER ON AN ON-BOARD COMPUTER SYSTEM COMPRISING A CHIP CARD

BACKGROUND OF THE INVENTION

1. Field of the Invention

The present invention concerns a method to obtain a secure counter on an embedded computer system having a chip card.

Its object is more particularly to provide an embedded environment (notably a mobile phone) with access to a monotonic counter that cannot be forged, residing on a chip card.

2. Description of the Prior Art

Generally, it is known that a monotonic counter is a counter which guarantees that its values changes with each call, i.e., it never gives the same value twice. Said counters are highly useful in computer systems to generate unique identifiers for example, and to combat so-called "replay" security attacks (an attacker who identifies an authorized value at a time t can, at a time t+ delta, "replay," i.e., give the previously detected value, in the hope that it is still authorized by the system).

Monotonic counters are also mostly incremental, since this does not give rise to any particular implementation difficulty. In this case, the counter also provides the guarantee that at each call it gives a higher value than for the preceding call. Time for example is a universal incremental source. Incremental monotonic counters are of particular interest to order events in relation to each other. For example, in some time-dating systems it is simply desired to know that document A was archived before document B. Rather than using an internal clock (which is generally costly, imprecise and non-secure, in that an attacker could change the time at will), computer systems frequently use an incremental monotonic counter.

Incremental monotonic counters are also highly desirable in the area of Digital Rights Management (DRM) notably to control that music previously played can no longer be played once related rights have expired.

In the remainder of this description, an incremental monotonic counter will be called a "monotonic counter".

While a monotonic counter on a personal computer (PC) does not give rise to any real difficulty, its integration in embedded environments (e.g. mobile telephone) is a much more complicated matter however. To produce a monotonic counter, a persistent memory zone is required with several re-write possibilities (to save the value of the counter when it is not powered up). Integration of a re-writable persistent memory into an embedded environment entails a non-negligible financial cost that is higher the more the equipment concerned is intended to be deployed on a large scale (e.g. a surcharge for millions of mobile phones). And yet embedded environments—like other computer systems—need monotonic counters, and market demand is no doubt higher in terms of DRM (games for portable video consoles, listening to music on mobile phones, iPod (trademark), etc).

OBJECT OF THE INVENTION

The purpose of the invention is more particularly to provide a reliable low-cost solution to fabricate a monotonic counter for cases in which the embedded environment has a smart card (which is the case in particular for mobile telephones with the SIM card).

SUMMARY OF THE INVENTION

For this purpose, it proposes a method comprising the following operating phases:

(i) storing, in the persistent memory of the chip card:
   a. a counting function FC
   b. a counter Cpt
   c. a private key Cf stored in the read-protected part of the memory zone,
the counter Cpt and the private key Cf being accessible solely by the counting function FC;

(ii) executing, on receipt by the chip card of a "counter request" emitted by a so-called "requesting" entity ER, the following operations:
   a. modification, by the counting function FC, of the counter Cpt ensuring unicity of the counter value given in reply to a given request,
   b. calculation, by the counting function FC, of a signature using the value of the counter Cpt such as modified at step (a) and the private key Cf;
   c. sending, by the counting function FC, a reply to the requesting entity ER, said reply including the value of the counter Cpt such as modified at step (a) and the signature calculated at step (b);

(iii) executing, on receipt by the embedded system of the reply to the counter request, verification of the signature contained in this reply.

As a general rule, the requesting entity ER can act on behalf of another application, of a system or a natural person, interacting with the embedded system.

Advantageously, at the step to calculate a signature during the execution phase of a counter request, the requesting entity ER is previously authenticated. The counter request will therefore only be executed if authentication has been successful.

Similarly, verification of the signature contained in the reply to the counter request can be made using a public key stored in the persistent memory on the embedded system.

According to this method, the monotonic counter is produced in the form of an application which is run inside a smart card (provided with a microprocessor). This application can be native (i.e. directly run directly on the microprocessor) or it may be interpreted by an interpretation engine (e.g. a virtual Java machine, a script interpreter, etc.). It has the benefit of:

material resistance (in terms of security) of the chip card. For example it is more difficult to visualize the content of a chip card with a microscope or to attempt to change its values (by laser beam etc.) than on the mother board of a PC;

the capacity of chip cards to save persistent data re-writable in memory (EEPROM).

cryptographic functionalities present on the majority of chip cards, these typically being used to store cryptographic keys.

The application thus produced:

provides a secure monotonic counter (which never gives the same value twice);

is difficult to attack from a material viewpoint;

and is optionally authenticated (the caller is sure that the value is indeed given by the monotonic counter).

BRIEF DESCRIPTION OF THE DRAWINGS

One embodiment of the invention is described below by way of a non-limiting example with reference to the appended drawing in which.

DESCRIPTION OF THE PREFERRED EMBODIMENTS

Figure 1:
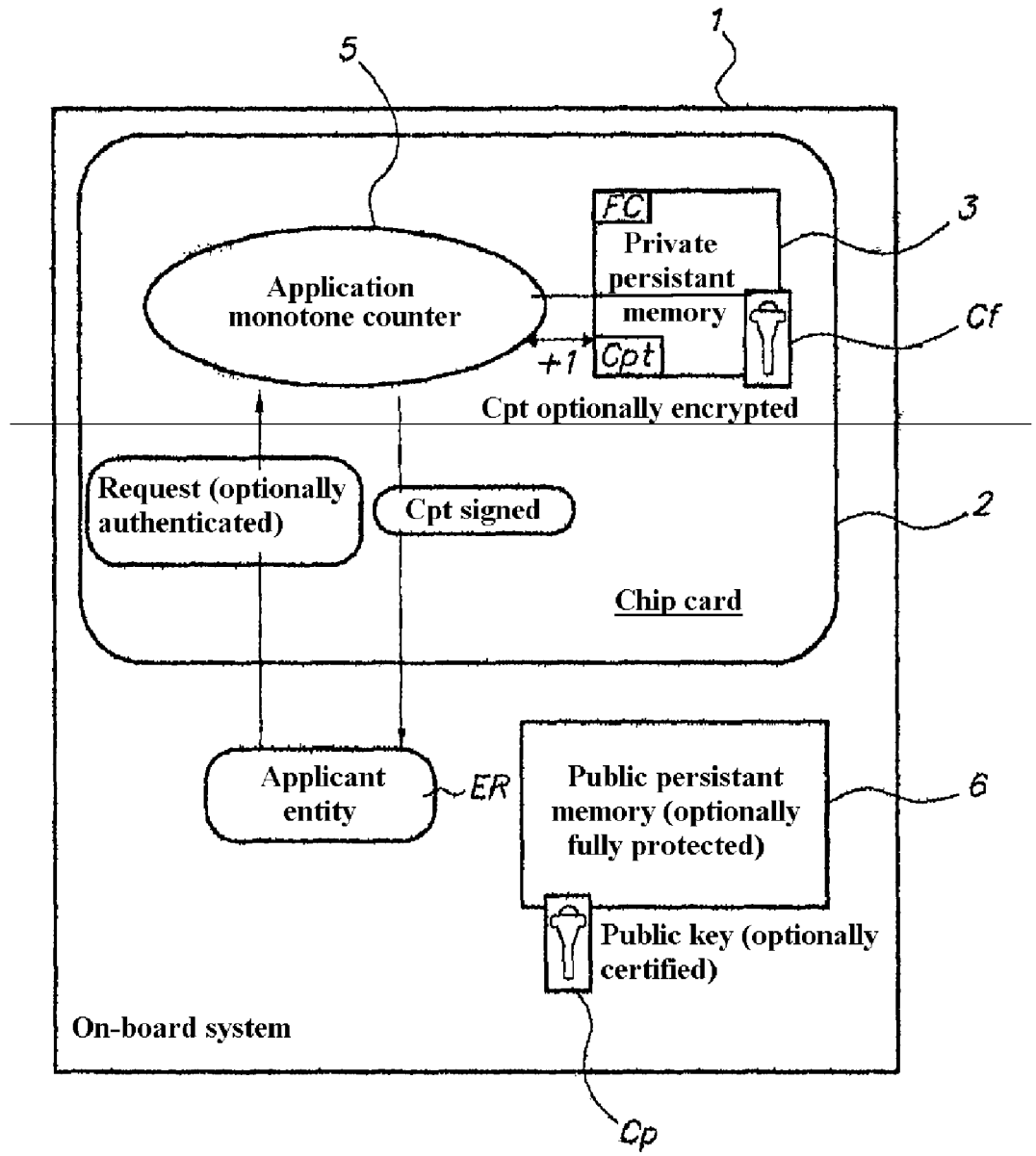
FIG. 1 is a synoptic diagram illustrating the detailed functioning of the monotonic counter in the case in which the public key is located on the embedded system.

In this example, the embedded system (block 1) has a chip card (block 2) comprising a private persistent memory (block 3) in which a counter Cpt is stored, a private key Cf stored in the re-writable part of the persistent memory zone (block 3), read-protected, and a counting function FC.

The counter Cpt and the private key Cf can be accessed solely by the counting function FC. Modification of the counter Cpt by the counting function FC consists of a+1 increment.

On the chip card (block 2) there is also a monotonic application (Application monotone counter, block 5). This application, which uses the private key Cf, can be automatically launched as the card 2 is powered up, or manually by the owner of the card 2. It replies to requests emitted by a caller, emitted outside the card.

The embedded system (on-board system, block 1) also comprises a public key Cp (or a public key certificate Ccp) stored in a public persistent memory (block 6) (ideally integrity-protected—i.e. it cannot be unduly modified) for example in a One-Time Programmable memory (OTP) since said memories do not give rise to any particular integration or financial difficulty (for example they are provided on mobile telephones). This solution, which corresponds to the solution illustrated in the single figure, allows control over cases in which an attacker attempts to construct a false monotonic counter application, with another pair of keys, and replaces the authentic public key by the public key of the false application.

Alternatively, the public key Cp can be stored:
on the chip card (block 2): for cases in which the embedded system (block 1) does not have (or has insufficient) OTP memory, the public key Cp can be stored in the persistent memory (block 3) of the chip card (block 2). To ensure its integrity, the chip card (block 2) must then guarantee that no application other than the monotonic counter application can write/modify this zone.
outside the embedded system: the public key Cp can also be obtained by the embedded system via other means e.g. via a dedicated PKI architecture (Public Key Infrastructure).

In the two latter cases—in which the public key Cp is not stored in memory on the embedded system (block 1)—it is also advisable to memorize an imprint of the public key Cp to be used on the embedded system. This can ensure that an attacker has not replaced the chip card (block 2) by another chip card, or has not mimicked the behaviour of an illegitimate PKI.

The public key Cp can also be certified by an authority attesting that the public key Cp truly corresponds to the monotonic counter application 5. In this case, it is sufficient to memorize the Ccp certificate containing the public key Cp. The public key Cp is used to verify the signature of the counter.

To obtain a value of the monotonic counter, the requesting entity ER firstly emits a monotonic counter request to the application 5 located on the chip card (block 2). Optionally, it is possible to authenticate the Requesting Entity ER by requesting it to supply a secret data item known to the chip card. This secret data item can be a PIN for example (Personal Identify Number), a password or a secret key known to the two entities. Authentication of the Requesting Entity ER ensures that the Requesting Entity ER is truly authorized to request a monotonic counter value, and therefore avoids attacks by service denial in which an attacker unceasingly requests a value making the service unavailable for other (legitimate) callers.

Next, the application 5 increments its internal counter. This counter is saved in the persistent memory (block 3) of the chip card (block 2) and is only accessible to the monotonic counter application 5. Optionally, the counter can be kept encoded (by the public key of the application). This prevents non-authorized entities knowing the current value of the monotonic counter. In particular, in the event of very close visual scrutiny the value revealed would be encoded and therefore unusable. The current value of the counter is then signed by the private key of the application, and the data items of counter value+ signature are returned to the Requesting Entity ER.

Finally, the Requesting Entity ER collects the public key Cp of the application. Depending on cases, this public key Cp can be collected in the memory of the embedded system (block 1) on the chip card (block 2) or externally. In the two latter cases, the imprint (if any) of the public key Cp then the signature of the counter must be verified. If the signature tallies, the caller is certain that the value of the counter is authentic. It can be used.

It is to be noted that in little-sensitive environments or on the contrary in highly-securitized environments, it is also possible to contemplate the non-signature (and non-verifying) of the value of the monotonic counter. The drawback is evidently that the caller is no longer certain of its authenticity: the value could possibly be provided by an attacker. In this case it is no longer of any use to store a pair of keys.

From an implementation viewpoint, the monotonic counter application 5 can be implemented very easily either as native application (provided that access to the persistent memory and to cryptographic functions is possible) or as interpreted application. In this latter case, the application 5 can be implemented as an applet within a Java card (registered trademark).

The invention claimed is:
1. A method to provide a secure counter on an embedded system having a chip card, the embedded system comprising a non re-writable public persistent memory; the method comprising the following operating phases:
(i) storing, in a private persistent memory of the chip card: a counting function, a counter, and a private key stored in a re-writable read-protected part of the private persistent memory, the counter and the private key being accessible solely by the counting function;
(ii) executing, upon receipt by the chip card of a counter request emitted by a requesting entity, the following operations:
(a) modifying, by the counting function, the counter ensuring uniqueness of a counter value given in reply to a given request,
(b) calculating, by the counting function, a signature using the value of the counter modified at operation (a) and the private key;
(c) sending, by the counting function, a reply to the requesting entity, the reply including the value of the counter modified at operation (a) and the signature calculated at operation (b);
(iii) verifying, upon receipt by the requesting entity of the reply to the requesting entity, the signature contained in the reply to the requesting entity with a public key or an associated public key certificate of the private key.
2. The method according to claim 1, further comprising authenticating the requesting entity, and wherein the calcu- lating a signature during the execution phase (ii) the counter request is only executed when authenticating the requesting entity is successful.

3. The method according to claim 1, wherein the counter is stored encoded.

4. The method according to claim 1, wherein modifying the counter by the counting function consists of an increment of the counter.

5. The method according to claim 1, wherein the public key or the associated public key certificate is stored into the public persistent memory on the embedded system.

6. The method according to claim 1, wherein the public key or the associated public key certificate is stored in the persistent memory of the chip card and returned to the embedded system at the request of the embedded system.

7. The method according to claim 1, wherein the public key or the associated public key certificate is provided by a public key infrastructure and returned to the embedded system at the request of the embedded system.

8. The method according to claim 6 wherein the public persistent memory on the embedded system is a One Time programmable memory.

9. The method according to claim 6, wherein the public key is an imprint of the public key.

* * * * *